United States Patent [19]

Uchino et al.

[11] 4,376,471
[45] Mar. 15, 1983

[54] EMERGENCY APPARATUS FOR ELEVATOR

[75] Inventors: Hideo Uchino; Masami Nomura; Takaaki Aoi; Masumi Kanbe, all of Inazawa, Japan

[73] Assignee: Mitsubishi Denki Kabushiki Kaisha, Tokyo, Japan

[21] Appl. No.: 226,906

[22] Filed: Jan. 21, 1981

[30] Foreign Application Priority Data

Jan. 21, 1980 [JP] Japan .................. 55-6093

[51] Int. Cl.³ .................. B66B 5/00; H02J 9/04
[52] U.S. Cl. .................. 187/29 R; 307/64; 307/73
[58] Field of Search .......... 187/29; 307/64-68, 307/72, 73, 75, 151, 155; 318/53-55, 59, 62; 363/109, 124, 137

[56] References Cited

U.S. PATENT DOCUMENTS

| | | |
|---|---|---|
| 2,701,033 | 2/1955 | Chiselbrook . |
| 3,144,917 | 8/1964 | Tressel . |
| 3,469,657 | 9/1969 | Sgori . |
| 3,610,371 | 10/1971 | Abbott .................. 187/29 |
| 3,869,639 | 3/1975 | Herzog .................. 307/65 X |
| 4,056,757 | 11/1977 | Mauch et al. .................. 307/64 X |
| 4,203,041 | 5/1980 | Sachs .................. 307/68 X |
| 4,316,097 | 2/1982 | Reynolds .................. 187/29 X |

*Primary Examiner*—S. J. Witkowski
*Assistant Examiner*—W. E. Duncanson, Jr.
*Attorney, Agent, or Firm*—Oblon, Fisher, Spivak, McClelland & Maier

[57] ABSTRACT

An emergency apparatus for elevator which converts a DC power into an AC power by an inverter device in an emergency state to feed the AC power to an AC traction motor and an AC motor for door-opening and closing which have different rated voltages so as to drive a cage of the elevator and to open and close a door of the cage comprises selectively feeding a power through said inverter device to either of said traction motor or said motor for door-opening and closing, in an emergency state.

5 Claims, 7 Drawing Figures

EMERGENCY APPARATUS FOR ELEVATOR

BACKGROUND OF THE INVENTION

1. Field of the Invention

The present invention relates to an improvement of an apparatus for operating a cage of an elevator at an emergency such as power stoppage.

When the cage of the elevator is stopped between floors at an emergency such power stoppage, passengers are uneasy and frightened because they are kept in the cage. In order to prevent such condition, an AC traction motor is driven by a DC power source such as a battery or an inverter device in the case of the AC elevator to operate the cage so as to stop on a nearest floor to escape from the cage.

2. Description of the Prior Arts

The apparatus shown in FIG. 1 has been known. In FIG. 1, the references R, S, T designate a three phase DC power source for 400 V; (1a) to (1c) designate contacts of a contactor for ascending operation which are closed for the ascending operation of the cage (not shown) in the normal state; (2a) to (2c) designate contacts of a contactor for descending operation which are closed for the descending operation of the cage on one group of the contacts (1a) to (1c) of the contactor for the ascending operation or the contacts (2a) to (2c) of the contactor for the descending operation is closed. (This is referred to as interlock). The reference (3) designates a traction motor as an induction motor having a rated voltage of 400 V which drives the cage; (4) designates the DC power source such as a DC battery; (5) designates a contact for a contactor for an emergency operation which is closed during the emergency operation; (6) designates an inverter comprising semiconductor devices for converting the DC power force into the AC power force; (7) designates an oscillation circuit for generating the pulse for determination of the output frequency of the inverter device (6); (8) designates a turn-on circuit for generating a turn-on signal for sequentially turning on elements of the inverter device (6) by receiving the output pulse of the oscillation circuit (7) as the input; (9a) to (9c) designate contacts of a contactor for the ascending operation which are closed for the ascending operation of the cage in the emergency operation; (10a) to (10c) designate contacts of a contactor for the descending operation which are closed in the descending operation; and the contacts (9a) to (9c) and (10a) to (10c) are respectively interlocked with each other and also interlocked to either of the contacts of (1a) to (1c) or (2a) to (2c) the contactors for the ascending operation or the descending operation as to be interlocked. An AC motor for door-opening and closing (not shown) can be connected. In the normal state, the AC power of the three phase AC power source R, S, T is fed through the contacts (1a) to (1c) or (2a) to (2c) of the contactor for the ascending operation or the descending operation to the traction motor (3) whereby the cage is driven. In the emergency state, the contact (5) of the contactor for emergency operation is closed whereby the AC power having a specific frequency converted by the inverter device (6) is fed through the contacts (9a) to (9c) or (10a) to (10c) of the contactor for the ascending operation or the descending operation, to the traction motor (3) whereby the cage is driven.

When the induction motor is driven by the inverter device (6), the following equation is usually given in view of the phenomenon of magnetic saturation and the torque.

$$V/f \approx V'/f'$$

wherein
V: voltage of the power source in the normal state;
f: frequency of the power source;
V': output voltage of the inverter device (6);
f': output frequency of the inverter device (6).

Therefore, when the traction motor (3) is driven, the output frequency f' and voltage of the battery are set to the suitable values in view of the speed and cost required for the emergency operation.

When an induction motor is used for a motor for door-opening and closing of the cage, sometimes the rated voltage of the traction motor (3) is different from the rated voltage of the motor for door-opening and closing. The voltage of the power source for the traction motor (3) is 400 V in three phase whereas the voltage of the power source for the motor for door-opening and closing is 100 V in three phase. In view of the above equation and the revolution speed of the motor for door-opening and closing, it is necessary to use a separate circuit for the motor for door-opening and closing then that shown in FIG. 1. Such feature has not been advantageous in view of the complicated circuit, the cost and equipments and the reliability.

SUMMARY OF THE INVENTION

It is an object of the present invention to provide an emergency apparatus for an elevator wherein a traction motor and a motor for door-opening and closing are selectively connected to a common inverter device in the emergency operation so as to feed the AC power converted by the inverter device to them whereby the structure of the circuit is simplified and the cost is low.

Another object of the present invention is to provide an emergency apparatus for an elevator wherein the output frequency of the common inverter device is changed depending upon the driving of the traction motor or the motor for door-opening and closing so as to set the torque in the emergency state to a desired value.

The other object of the present invention is to provide an emergency apparatus for elevator whereby the order of phases of the common inverter is inverted as desired to simplify the structure of the contacts for setting the directions of the rotation of the motors.

BRIEF DESCRIPTION OF THE DRAWINGS

FIG. 5(a) shows the timing in "H" level of the phase revolution command signal;

FIG. 5(b) shows the timing in "L" level of the phase revolution command signal;

DETAILED DESCRIPTION OF THE PREFERRED EMBODIMENTS

Figure 2:
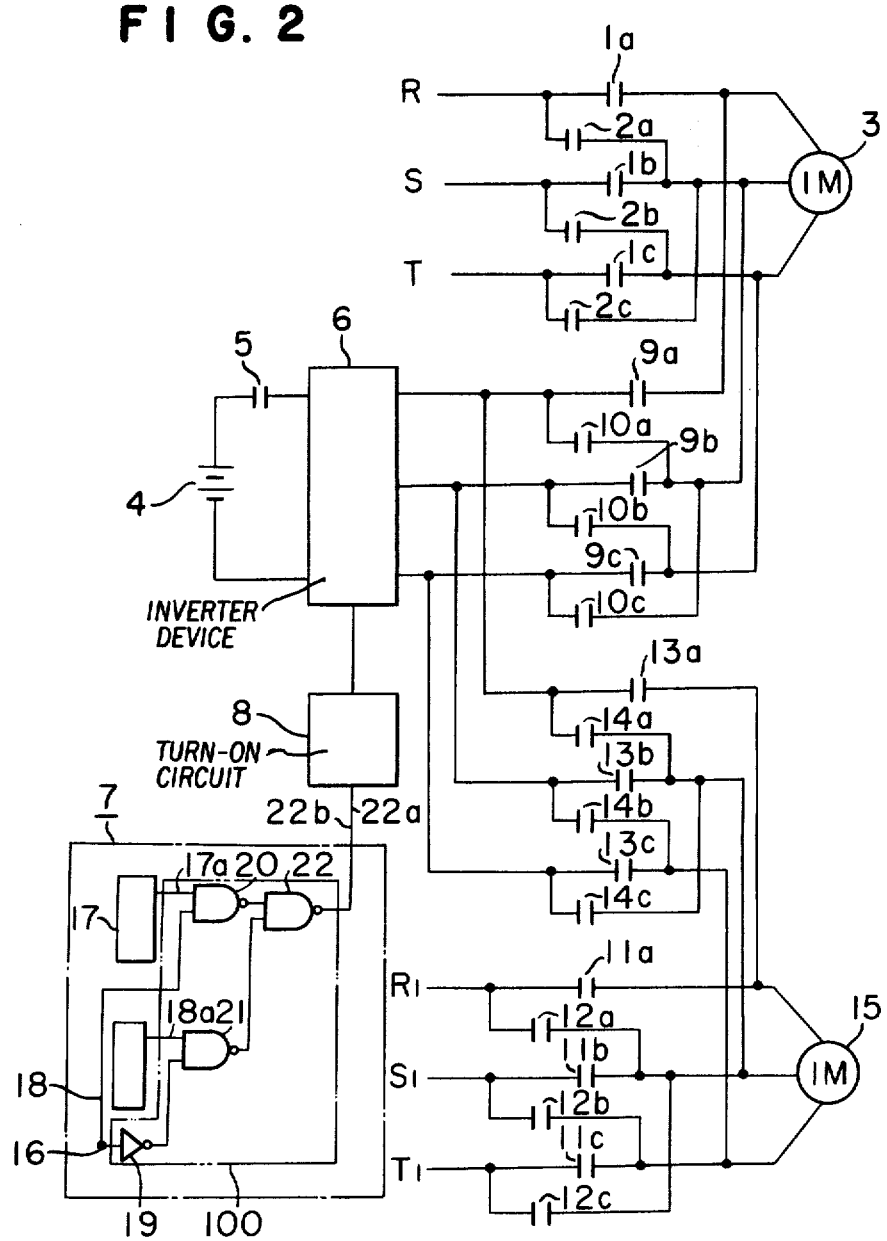
FIG. 2 is a schematic view of one embodiment of the emergency apparatus for an elevator according to the present invention.
Figure 3:
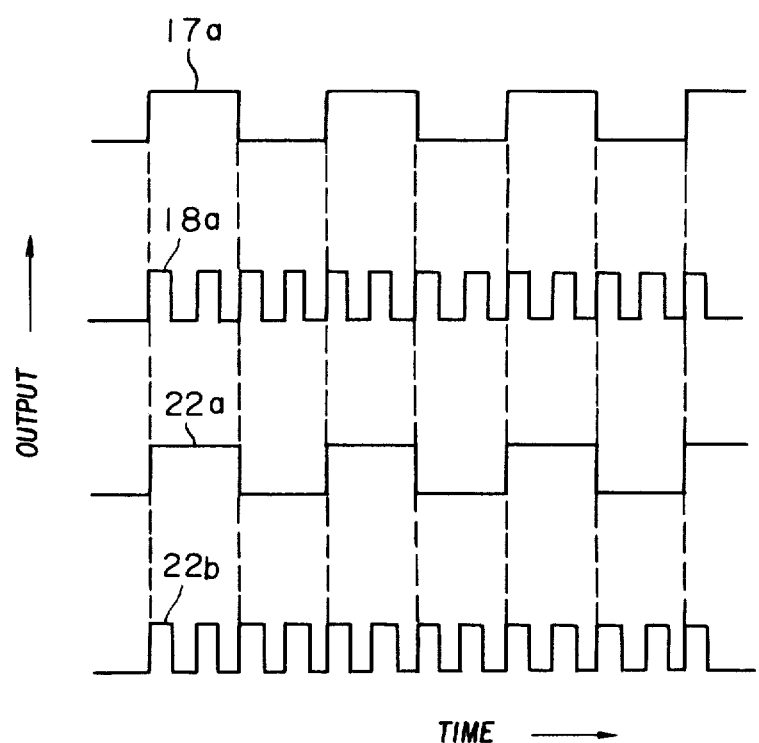
FIG. 3 shows pulse waveforms of a pulse oscillation circuit shown in FIG. 2.

Referring to FIGS. 2 and 3, one embodiment of the present invention will be illustrated.

In the drawings, the references $R_1$, $S_1$, $T_1$ designate the three phase AC power source (100 V), and (11a) to (11c) designate the contacts of the contactor for door-opening and closing in the normal state; (13a) to (13c) designate the contacts of the contactor for door-opening and closing in the emergency operation; (14a) to (14c) designate contacts of the contactor for door-opening and closing; (15) designates a motor for door-opening and closing which is an induction motor having a rated voltage of 100 V which drives the door of the cage; (16) designates a driving command signal which gives "H" level in the driving of the traction motor (3) and "L" level in the driving of the motor for door-opening and closing (15); (17) designates an oscillator which generates a pulse (17a) having the frequency shown in FIG. 3; (18) designates an oscillator which generates a pulse (18a) having a frequency higher than the frequency of the pulse (17a); (19) designates an NOT gate; (20) to (22) designate NAND gates; (22a) and (22b) designate outputs of the NAND gate (22).

The logical circuit (100) is formed by the NOT gate (19) and the NAND gates (20) to (22). The circuit (100) receives the outputs of the first oscillator (17), the second oscillator (18) and the driving command signal (16) to output the output signal to be turn-on circuit (8).

The contacts (11a) to (11c) are respectively interlocked to the contacts (12a) to (12c) and the contacts (13a) to (13c) are respectively interlocked to the contacts (14a) to (14c). The contacts (1a) to (1c) are respectively interlocked to the contacts (2a) to (2c) and the contacts (9a) to (9c) are respectively interlocked to the contacts (10a) to (10c).

The operation of the embodiment will be illustrated in detail.

Figure 1:
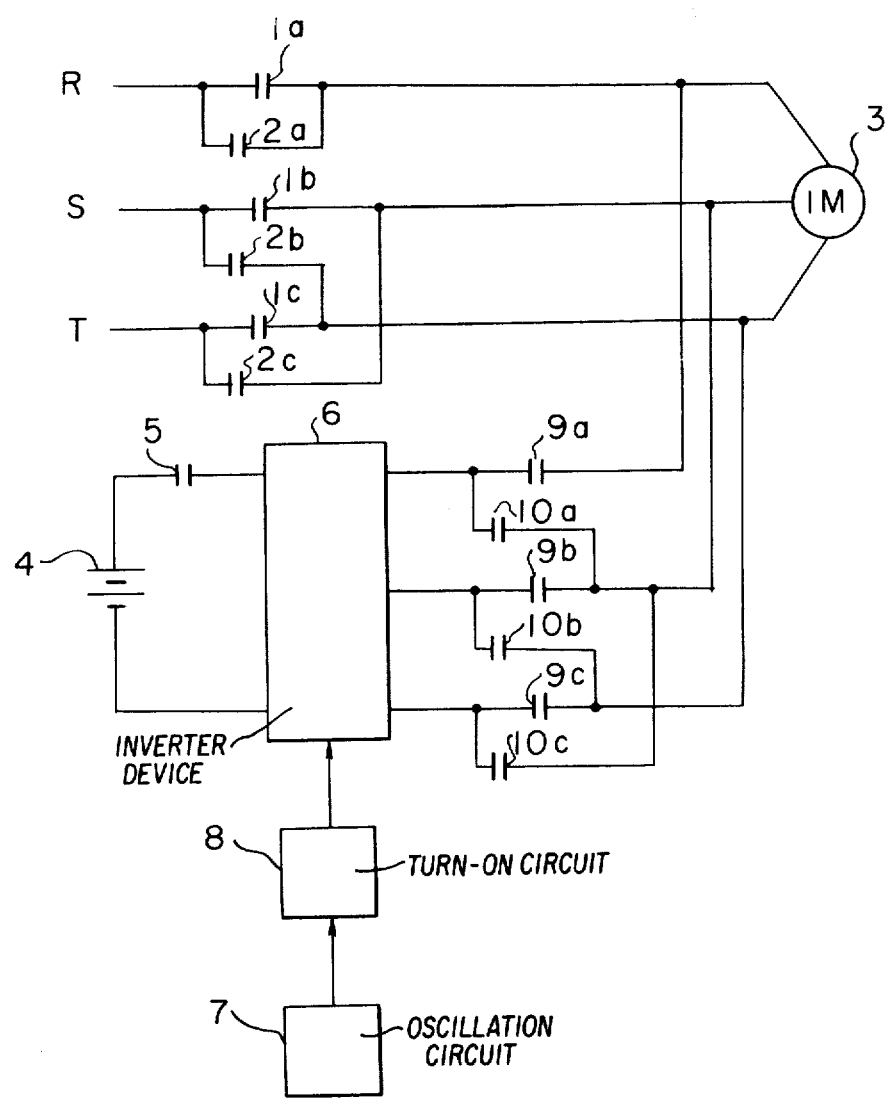
FIG. 1 is a schematic view of one embodiment of the conventional emergency apparatus for an elevator.

The driving of the traction motor in the normal state has been illustrated by referring to FIG. 1. The driving of the motor for door-opening and closing (15) in the normal state is also easily found from the above-mentioned description and accordingly, it is not recited.

When the cage stops between floors in the power stoppage etc., the electromagnetic braking which held the traction motor (3) is released by a circuit (not shown). When the safety is confirmed by a circuit (not shown), the driving command signal (16) becomes "H" level, whereby the output of the NAND gate (20) is in the reverse phase to the pulse (17a) of the oscillator (17). On the other hand, the output of the NOT gate (19) becomes "L" level, whereby the output of the NAND gate (21) is kept in "H" level regardless of the pulse (18a) of the oscillator (18). Therefore, the output (22a) of the NAND gate (22) is the same phase as that of the pulse (17a). The inverter device (6) generates an AC power having the frequency corresponding to the frequency of the pulse (17a) to feed the power through the contacts (9a) to (9c) or (10a) to (10c) of the contactor for the ascending operation or the descending operation, to the traction motor (3), whereby the cage runs to reach the door openable section of the nearest floor and the contacts (9a) to (9c) or the contacts (10a) to (10c) are opened to actuate the electromagnetic braking to stop the cage. In the operation, the phase relation of the inverter device is fixed.

When the driving command signal (16) becomes "L" level, the output of the NAND gate (20) is held in "H" level. The output of the NOT gate (19) becomes "H" level whereby the output of the NAND gate (21) has the reverse phase to the pulse (18a) of the oscillator (18) and the output (22b) of the NAND gate (22) has the same phase as that of the pulse (18a). The output frequency of the inverter device (6) is four times of the frequency at the driving of the traction motor (3) to give the equation of $V/f \approx V'/f'$. The AC power having the frequency f' is fed through the contacts (13a) to (13c) of the contactor for door-opening and closing to the motor for door-opening and closing (15) whereby the motor (15) is rotated to open the door. When the door opens, the contacts (13a) to (13c) are opened. The contacts (14a) to (14c) for door-opening and closing are closed after a specific period from the door-opening, whereby the motor (15) reversely rotated to close the door. When the door closes, the contacts (14a) to (14c) are opened. In such operation, the inverter device (6) is commonly used, whereby the speed for door-opening and closing is slower than the speed in the normal state, however it should be allowed since it is in the emergency state.

In this embodiment, the ratio of the output voltage of the inverter device (6) to the voltage of the power source in the normal state is substantially the same as the ratio of the frequency of the output of the inverter device (6) to the frequency of the power source in the normal state in the switching whereby the torque in the emergency state is substantially the same as the torque in the normal state.

In this embodiment, the frequency of the output of the inverter device (6) in the emergency is changed from the frequency in the normal state so as to give the same torque. If the frequency of the output in the emergency state is the same as the frequency in the normal state, the torques of the motors (3), (15) are lower than the torques in the normal state. When the motors (3), (15) can be driven by such lower torques, this feature can be applied in the practical operation.

The inverter device (6) is not limited to the semiconductor type inverter device and can be the rotary type inverter device which can control frequency of the output be varying its revolution speed or the inverter device which opens and closes a contactor in varied time interval to control frequency of the output.

Figure 4:
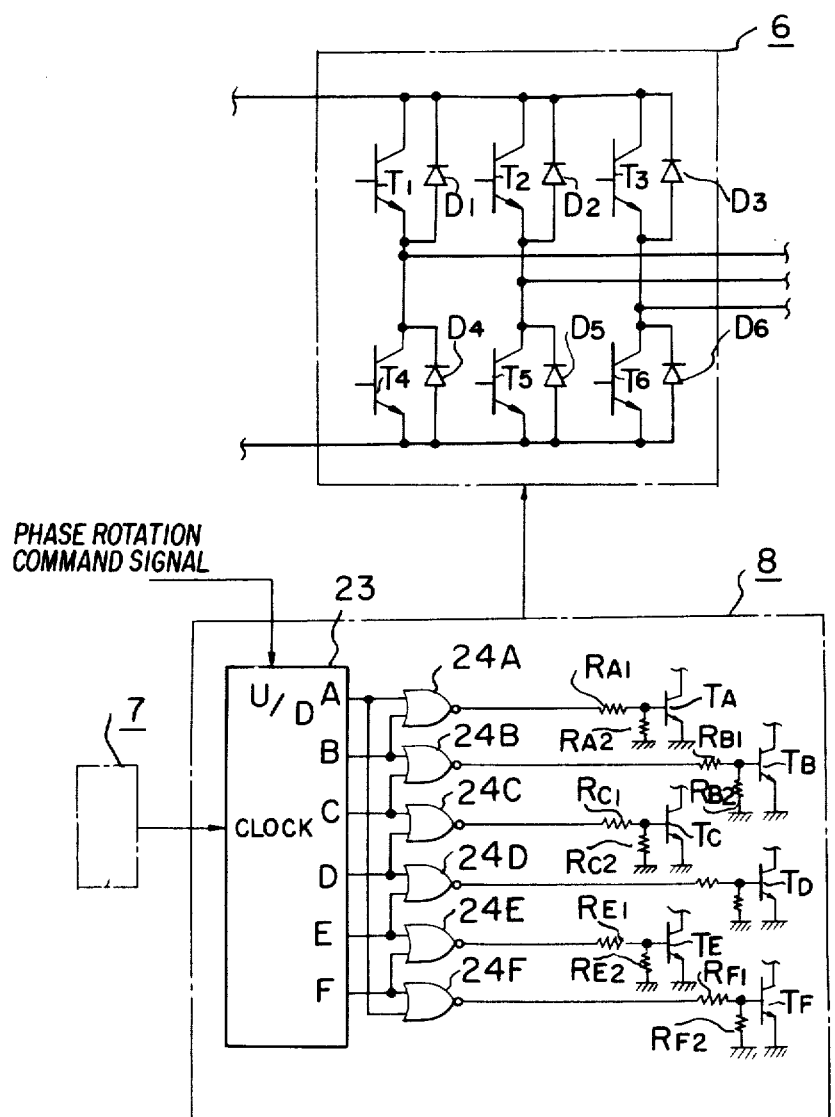
FIG. 4 is a schematic view of the other embodiment of an inverter device and a turn-on circuit thereof used in the emergency apparatus for the elevator according to the present invention.
Figure 5:
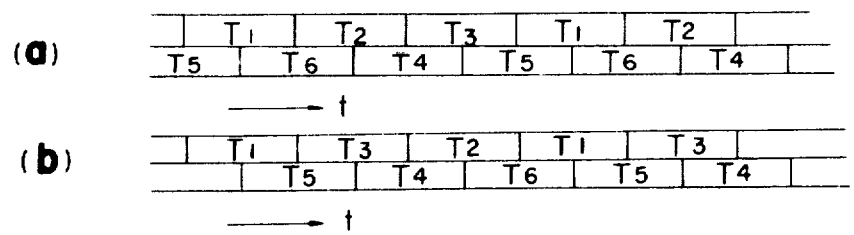
FIG. 5 shows timing of the turn-on of the inverter device.
Figure 6:
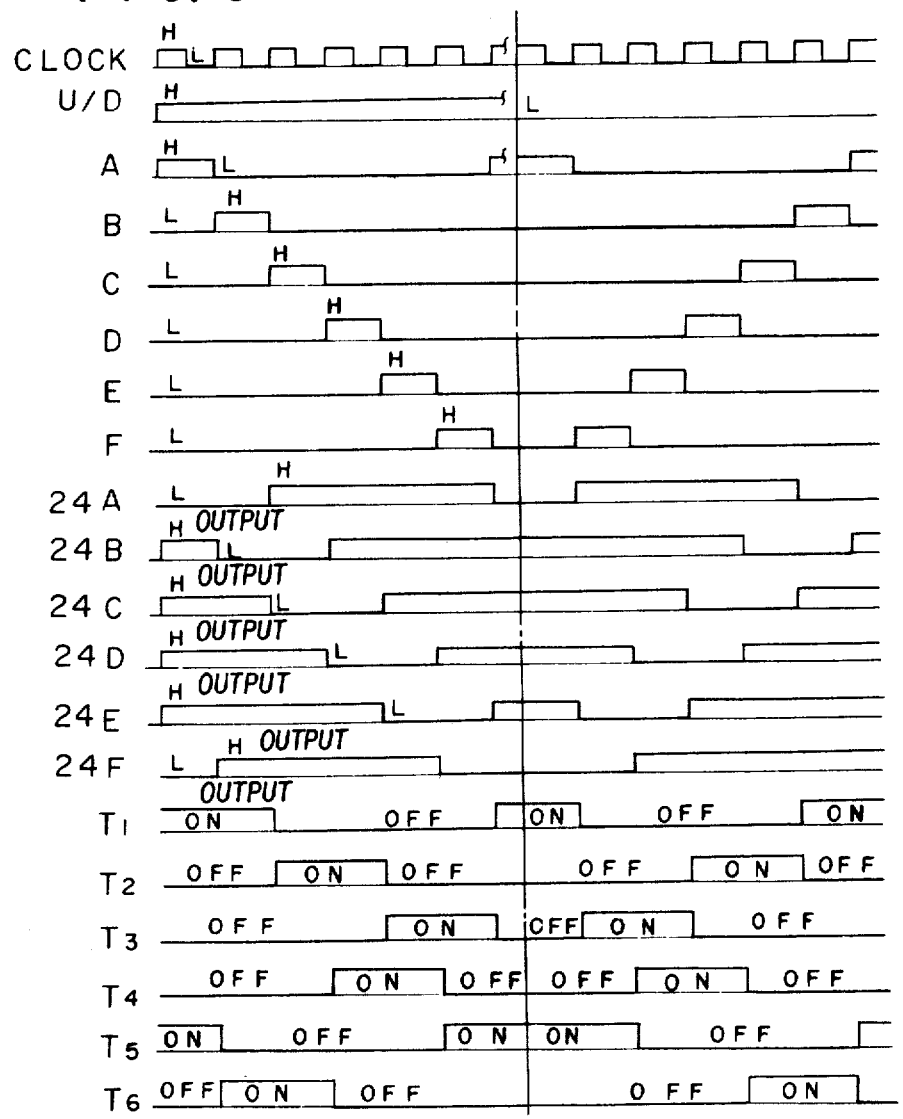
FIG. 6 is a timing chart showing the states of the parts of the inverter device and the turn-on circuit shown in FIG. 4.

In this embodiment, the electromagnetic contactors (13), (14) for door-opening and door-closing and the electromagnetic contactors (9), (10) for ascending operation and the descending operation are equipped. Thus, it is possible to equip with only one electromagnetic contactor for door-opening and closing and only one electromagnetic contactor for ascending and descending operation which are respectively used by inverting order of phases of the inverter as shown in FIGS. 4 to 6. It can be seen in FIG. 7.

In FIG. 4, the inverter device (6) comprises transistors $T_1$ to $T_6$ and diodes $D_1$ to $D_6$; and the turn-on circuit (8) comprises hexagonary up/down counter (23); an U/L terminal which switches the counter (23) to either of an up-counter or a down-counter depending upon level "H" or "L" of the phase rotation command signal; output terminals A to F of the counter (23);

NOR elements (24A) to (24F); resistors $R_{A1}$, $R_{A2}$, transistors $T_A$, resistors $R_{F1}$, $R_{F2}$ and transistor $T_F$. The counter (23) is formed to be hexagonary counter corresponding to the number of the transistors $T_1$ to $T_6$ and inputs clock signal of the oscillation circuit (7). When the outputs of the NOR elements (24A), (24B), (24C), (24D), (24E), (24F) are in "L" level, the corresponding transistors $T_1$, $T_6$, $T_2$, $T_4$, $T_3$, $T_5$ are respectively connected to be in turn-on state. The NOR elements (24A) to (24F) form a logical circuit connected to the counter (23) in the output side.

FIG. 5 as the timing chart shows the relation of the levels of the signals received at the U/D terminals and the ON state of the transistors $T_1$ to $T_6$. When the level of the signal is in "H", the transistors $T_1$ to $T_6$ are in ON state in the combination shown in FIG. 6(a). In FIG. 6, the arrow line t shows the time to the arrow line and the references $T_1$ to $T_6$ designates the transistors in ON state. On the other hand, when the level of the signal is in "L", the transistors $T_1$ to $T_6$ repeat ON-OFF state in the combination shown in FIG. 6(b). As it is clear from FIGS. 5(a) and 5(b), the phase rotation is in reverse direction.

FIG. 6 shows the states of various parts shown in FIG. 4. In FIG. 6, the arrow line t shows the time and the references "H", "L" designate levels of the signals; the references "ON", "OFF" designate states of the operations. The left side from the dotted chain line shows the states in the "H" level of the signal at the U/D terminals and the right side from the dotted chain line shows the states in the "L" level of the signal at the U/D terminals. As it is clear from FIGS. 4~6, the ON-OFF timing modes of the transistors $T_1$ to $T_6$ is reversed and accordingly the phase rotation of the output of the inverter device (6) is reversed depending upon the level of the signals at the U/D terminals (level of phase rotation command signal).

Figure 7:
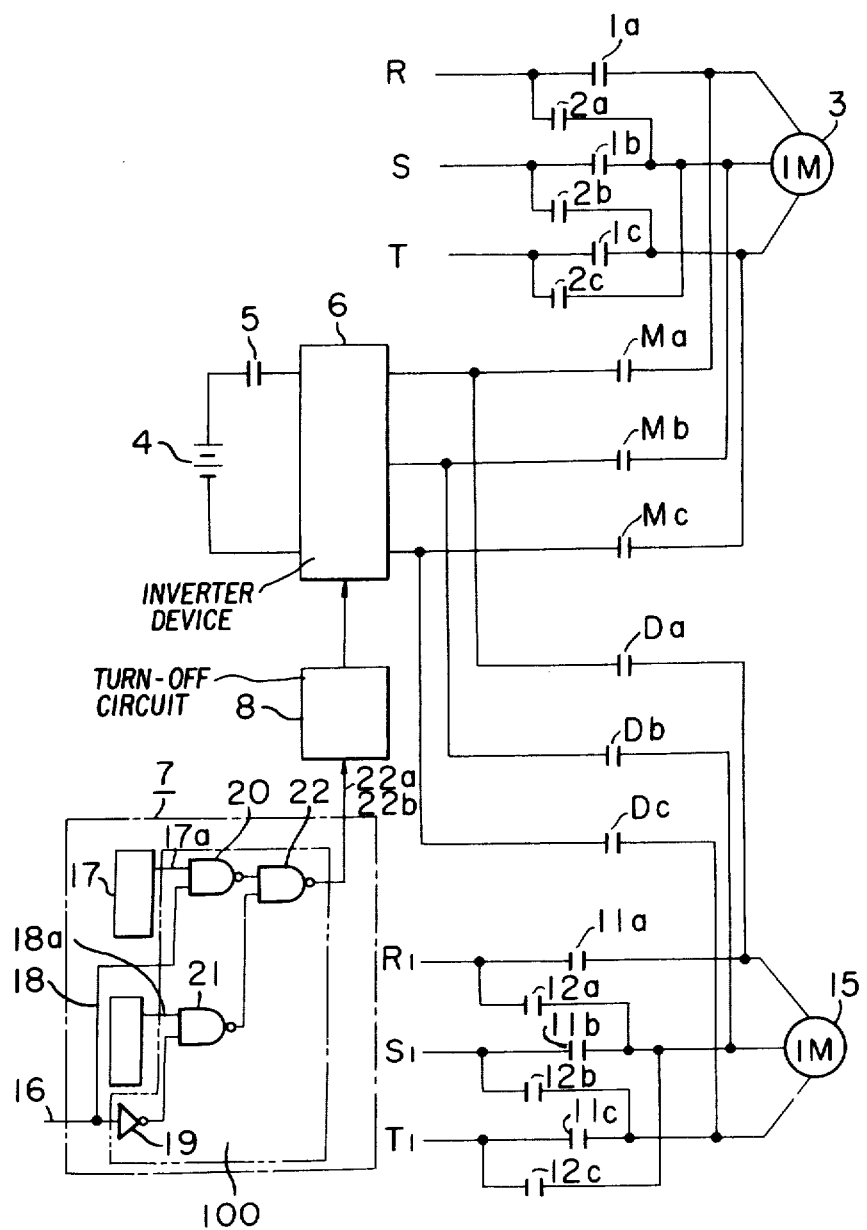
FIG. 7 is a schematic view of the other embodiment of the present invention.

FIG. 7 shows the structure of the apparatus using the inverter devices shown in FIGS. 4 to 6. In FIG. 7, the references Ma-Mc designate contacts for motor driving; and Da-Dc designate contacts for door-opening and closing. That is, when the inverter device whose phase rotation can be switched as shown in FIGS. 4 to 6 is used, the contacts 9a-9c, 10a-10c, 13a-13c and 14a-14c shown in FIG. 2 need not to be used. Only one set of the contacts Ma-Mc for closing in the motor deriving and one set of the contacts Da-Dc for closing in the door-opening or closing can be used instead of the contacts 9a-9c and 13a-13c. Therefore, only each pair of contacts are used. The contacts for motor driving Ma-Mc and the contacts for door-opening and closing Da-Dc should be interlocked.

We claim:

1. In an emergency apparatus for operating an elevator which converts a DC power into an AC power by an inverter device in an emergency state to feed the AC power to an AC traction motor and AC motor for door-opening and closing with each of said motors having different rated voltages so as to drive a cage of the elevator and to open and close a door of the cage, an improvement which comprises:
   means for selectively feeding a power through said inverter device to either of said traction motor or said motor for door-opening and closing, in an emergency state; and
   an oscillation circuit for varying the frequency of the output of said inverter device in the feeding of the AC power.

2. The emergency apparatus for elevator according to claim 1 wherein said oscillation circuit comprises a first oscillation circuit which oscillates in a first frequency; a second oscillation circuit which oscillates in a second frequency; and a logical circuit which inputs the outputs of said first and second oscillation circuits and a driving command signal which commands the driving of either of said traction motor or said motor for door-opening and closing.

3. The emergency apparatus for elevator according to claim 2 wherein said inverter device has a structure for outputting a three phase AC power.

4. The emergency apparatus for elevator according to claim 3 wherein said inverter device is turned on through a turn-on circuit so as to give both directions of phase rotation of the three phase AC output.

5. The emergency apparatus for elevator according to claim 4 wherein said turn-on circuit inputs the phase rotation command signal and the clock signal of said oscillation circuit and said turn-on circuit comprises a counter having figures corresponding to number of arms of said inverter device and a logical circuit connected to said counter in the output side.

* * * * *